Dec. 11, 1956
G. L. BEERS
2,773,663
COMBINED HOLDER AND CARRYING CASE FOR
AN ELECTRICAL APPLIANCE
Filed May 6, 1953
2 Sheets-Sheet 1
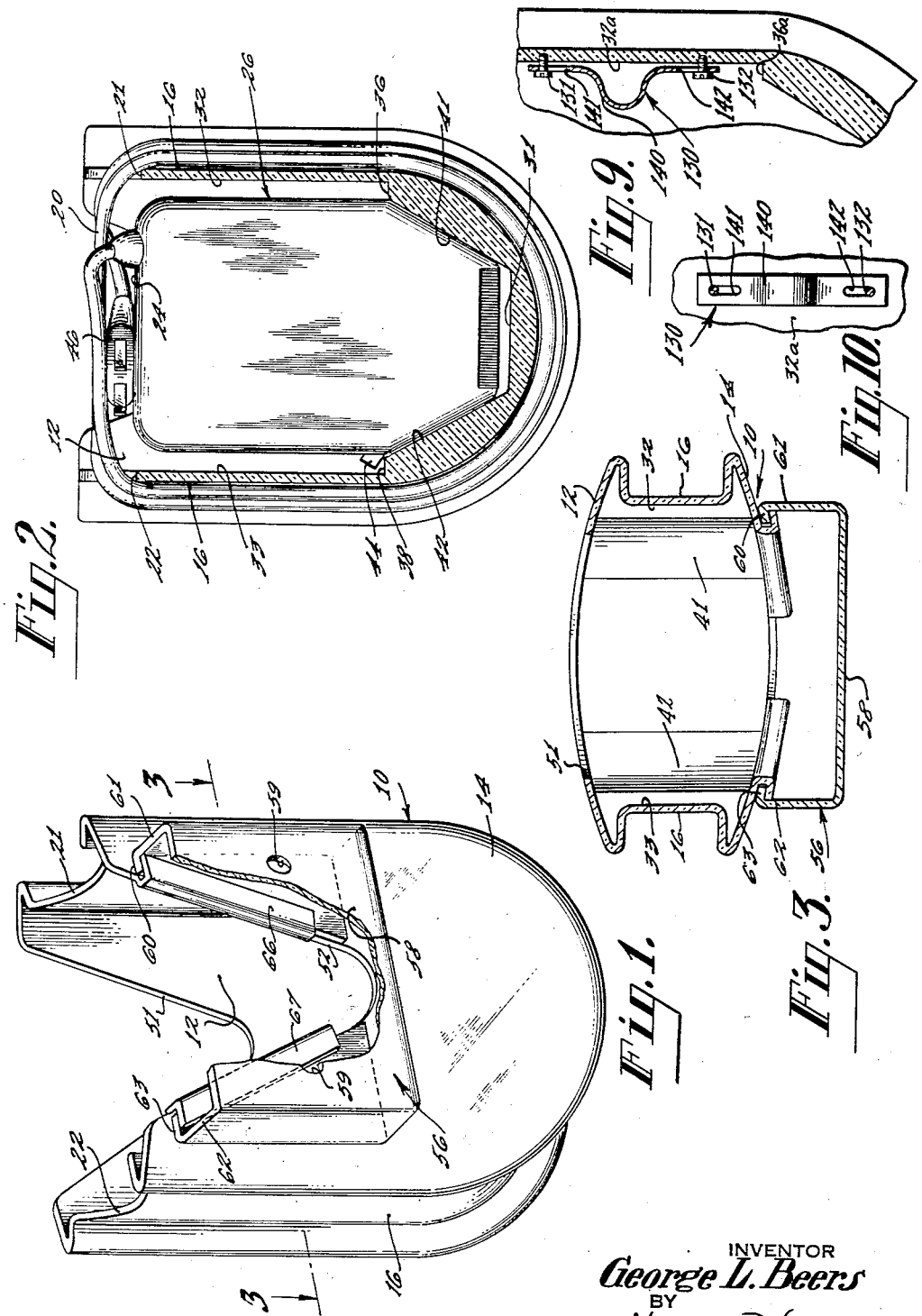
INVENTOR
*George L. Beers*
BY
*George J. Craig*
ATTORNEY

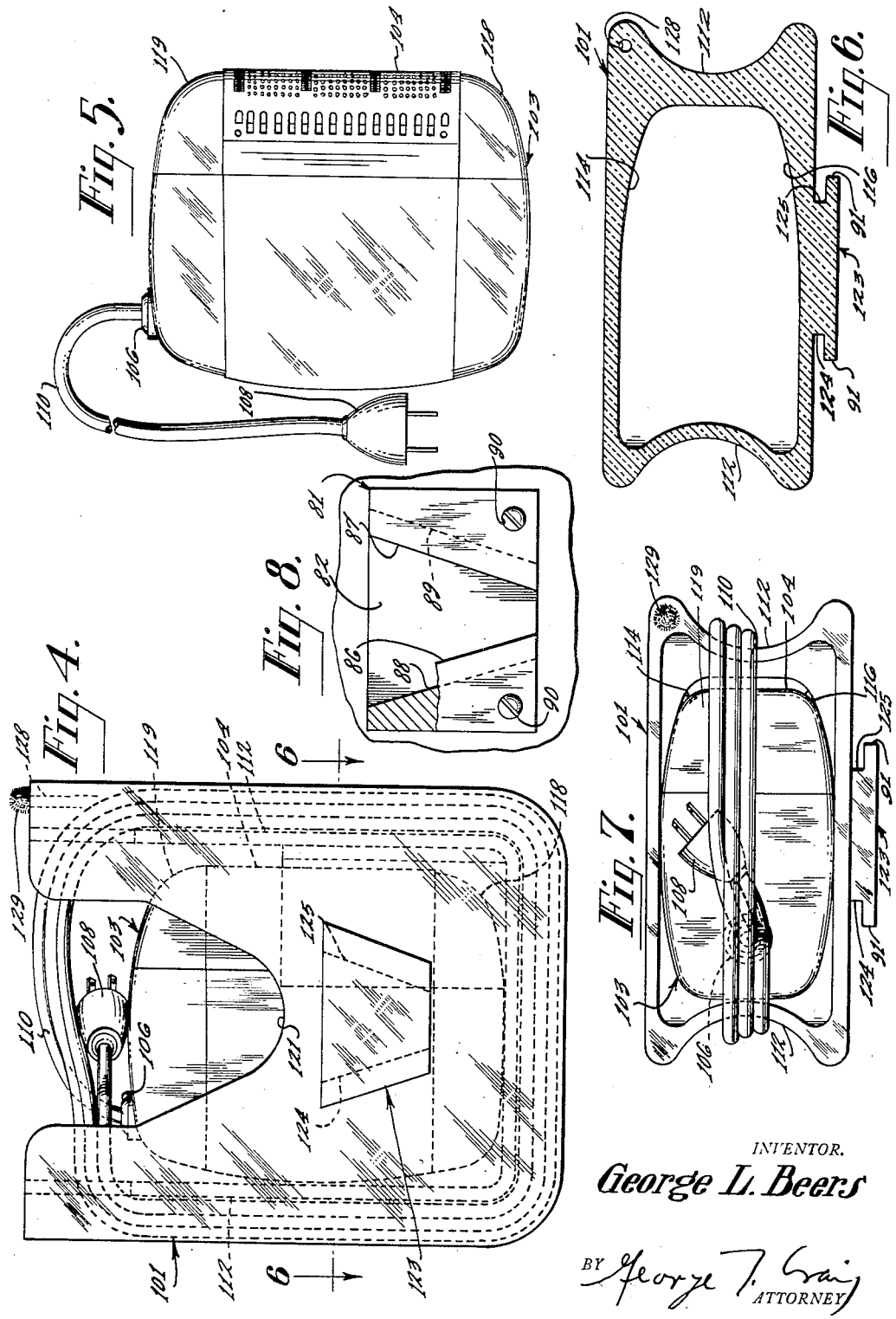

United States Patent Office 2,773,663
Patented Dec. 11, 1956

2,773,663
COMBINED HOLDER AND CARRYING CASE FOR AN ELECTRICAL APPLIANCE

George L. Beers, Haddonfield, N. J.

Application May 6, 1953, Serial No. 353,378

10 Claims. (Cl. 248—314)

The present invention relates to a combined holder and carrying case for an electrical appliance, such as an electric shaver, and more particularly, to a holder for an electric shaver, having means to store the shaver cord in a conveniently accessible manner, and means for detachable engagement with a stationary bracket whereby the holder may be used as a fixed storage receptacle for the shaver, or it may be used as a portable carrying case.

Electric shavers have achieved popularity and are in wide use, but no arrangement has heretofore been provided for neatly and conveniently storing the shaver and its connecting cord so as to be ready for instant use at a desired shaving location. In fact, the nuisance of taking the electric cord from prior art cord storage devices and connecting it to the shaver has retarded more extensive use of electric shavers. Prior art cord storage devices required folding of the cord or use of inaccessible reels. Connection plugs to electrical devices which in normal use are moved about have been a serious source of trouble. The present invention provides a combined holder and carrying case which permits the connecting cord to be permanently attached to the device.

Carrying cases which have been provided are clumsy and do not have an arrangement for holding the cord in such a way that it is ready for instant use. In accordance with the present invention, a case or holder for an electric shaver is provided which is formed to serve as a peripheral reel for the cord. The case is portable and may be carried in the pocket or in a travelling case or bag. It may be fitted conveniently into a zipper pouch. The invention also contemplates the provision of a bracket to be fixed to a wall, and the case or holder has means for detachable engagement with the bracket. The bracket, which is unobtrusive in appearance, may be mounted near an electric outlet and a mirror. With the case in position on the bracket, the shaver is ready for instant use. The case or holder may be provided, within the scope of the invention, with means for automatically switching the shaver off when it is inserted in the case after use, and for switching it on.

The case may also be provided, in accordance with the invention, with means for holding an electric shaver accessory, such, for example, as a brush.

The principal object of this invention is to provide a novel combined holder and carrying case for an electrical appliance, such, for example, as an electric shaver.

Another object is to provide a holder or carrying case for an electric shaver, having novel means to store the shaver cord in a conveniently accessible manner.

Another object of the invention is to provide a holder for an electrical appliance, having means to store the cord in a conveniently accessible manner without detaching the cord from the appliance.

A further object is to provide a carrying case for an electric shaver, having means whereby it may be secured to a wall or the like in a desired location.

Still another object is to provide a novel holder or carrying case for an electric shaver, having means for storing a shaver cleaning accessory.

A still further object is to provide a novel switch actuating device.

Other objects and advantages of the present invention will, of course, become apparent and immediately suggest themselves to those skilled in the art to which the invention is directed from a reading of the following specification in connection with the accompanying drawing, in which:

Fig. 1 is a view in perspective of an illustrative embodiment of the combined holder and carrying case of the present invention together with a holding bracket;

Fig. 2 is a view in sectional elevation of the embodiment of Fig. 1 with a known type of shaver and cord accommodated therein, the section being taken vertically and longitudinally substantially in the center;

Fig. 3 is a plan view in section along the line 3—3 of Fig. 1;

Fig. 4 is a view in rear elevation of another illustrative embodiment of the combined holder and carrying case of the present invention;

Fig. 5 is an elevational view of the outline of a well known general type of shaver which may be received by the embodiment of Fig. 4;

Fig. 6 is a plan view in section along the line 6—6 of Fig. 4;

Fig. 7 is a top plan view of the embodiment of Fig. 4;

Fig. 8 is a front elevation, partially in section, of a modified bracket to be secured on a wall, or the like, and receive a holder having features of this invention;

Fig. 9 is a fragmentary view of a modification including a switch actuating device; and Fig. 10 is a view in plan of the device of Fig. 9.

Referring to Figs. 1 to 3 of the drawing, the combined holder and carrying case is designated generally by reference character 10. The combined holder and carrying case 10 will be referred to as a "holder" for the sake of convenience of description in the following. In the form shown it comprises a front wall 12, a rear wall 14 and peripheral wall 16. The latter extends along three sides of the holder 10 leaving the top thereof open. The peripheral wall 16 is curved inwardly so as to provide a peripheral recess or groove to receive convolutions of the electric cord 20. As shown in Figs. 1 and 2, the peripheral wall 16 ends at the locations 21 and 22 so as to raise the top runs of the cord convolutions above the bottom line 24 of an inverted shaver 26 inserted in the holder 10. This provides a space for the plug 46 and the flexibility of the cord holds it in place. The showing of the shaver 26 is included to illustrate the utility of the combined holder and carrying case 10 and the disposition of the cord 20. The length of the cord is preferably such that the plug 46 comes at the top to be tucked in as shown. The groove for the cord is in a plane to provide maximum diameter and minimum number of turns. This feature reduces wear on the cord, and the cord can be placed in the groove or removed therefrom with a minimum of effort. The cord when wound in the groove may also serve as a "bumper" and provide additional protection for the enclosed shaver.

Fig. 2 illustrates the inner configuration of the peripheral wall 16 which, in the illustrative embodiment of Fig. 1, is designed to provide full support for the shaver 26 while at the same time protecting the active face of each cutter by preventing contact with the bottom 31. The substantially parallel sides 32 and 33 are spaced apart a sufficient distance to receive the body of the shaver 26. Shoulders 36 and 38 join the converging portions 41 and 42 of the inner configuration of the peripheral wall 16. The angle and location of each converging portion 41 and 42 is preferably selected to conform to the outline of the shaver 26 to be accommodated by the combined holder and carrying case 10.

The shaver 26 is indicated as having a switch operating thumb piece 44 which engages either the shoulder 28, as shown, or the shoulder 36 when the shaver is inserted in the holder 10. This provides a means for automatically switching off the shaver after use upon inserting it in the holder 10. This feature is especially convenient when the holder 10 is to remain in position on a wall, or the like, and the plug 46 is to be left in a wall receptacle or other electric outlet. Also, the shaver control switch may be arranged to turn on the shaver when it is removed from the holder 10. An embodiment of the invention which accomplishes this result is illustrated in Figs. 9 and 10. In this embodiment a U shaped spring 130 engages the switch operator as the shaver is removed from the holder. Slots 141 and 142 are provided near each end of the spring and extend lengthwise between the rivets or screws 131 and 132. These rivets or screws hold the spring in place on the body 32a of the holder, but the slots permit the spring to be compressed as the control switch; for example, the switch operator 44 passes the hump 140 in the spring in either direction. The portions of the holder designated 32a and 36a correspond to the areas in Fig. 2 designated 32 and 36. The slots 141 and 142 in the spring 130 are of sufficient length to permit the spring to be compressed against the wall 32a. The stiffness of the spring causes the control switch operator to move to the end of its travel in either direction before the spring is compressed to permit the control switch operator to move past the spring. Thus, the spring can be used to move the control switch on the shaver to the "off" position when the shaver is inserted into the holder and to the "on" position when it is removed therefrom.

To facilitate insertion and removal of a shaver, the front and rear walls of the holder 10 are notched as indicated by reference characters 51 and 52. This allows the body of the shaver to be firmly grasped without danger of dropping.

In the embodiment of Figs. 1 to 3, a bracket 56 is provided having a back plate or wall 58 apertured at 59 to receive securing screws, or the like, for the purpose of fastening the bracket to a wall or other support at a convenient location. The bracket of Fig. 1 is shown as having outwardly turned sides 61 and 62, and inwardly projecting parts 60 and 63. The inner edges of the latter have sloping edges to receive the outwardly turned flanges 66 and 67 on the edges of the notch 52 in the rear wall 14 of the holder 10. The bracket 56 is so shaped that it cooperates with the notches 51 and 52 to provide access to the shaver when it is enclosed in the holder and mounted on the bracket 56. With the bracket 56 permanently secured to a wall, the holder 10 may be easily lifted from engagement with the bracket 56 whereupon the holder 10 is free to serve as a carrying case.

It will be understood that the holder 10 may be molded or otherwise formed from a suitable plastic material to suit the contours of the shaver or shavers to be accommodated. In a molded structure, simple grooved projections can serve the purpose of the flanges 66 and 67.

Fig. 8 shows a simplified form of bracket 81 which may be readily molded from a suitable plastic. In this form of bracket, the generally solid structure is recessed to provide a back wall 82, the recess being defined by sloping sides 86 and 87 of less depth than the total thickness of the bracket. The sides 86 and 87 are grooved as indicated at 88 and 89 to receive flanges, such as the flanges 66 and 67 of Fig. 1. When grooved projections are employed on the holder, as indicated in Fig. 7, the outer lips 91 of the grooves are received in the grooves 88 and 89. Holes 90 receive screws or other suitable fastening means. The back wall 82 is sufficiently thick to space the holder from the wall to allow ready access to a shaver. Normally the weight of the holder and the fit between the holder and the stationary bracket are sufficient to prevent movement of the holder with respect to the bracket when the shaver is removed from the holder, however, any of the well known locking means may be used, to prevent movement between the holder and the bracket until it is desired to remove the holder from the bracket whereupon the locking means may be released.

Figs. 4, 6 and 7 show a modified combined holder and carrying case 101 which is designed to receive a shaver 103 of the general type shown in outline in Fig. 5. This shaver has a shaving head or comb plate 104 and a detachable plug 106 extending from the side of the shaver. The plug 106 and the plug 108 are parts of the electric cord 110. It is to be noted that the plug 106 may be eliminated when the shaver 103 is to be stored in the holder 101 as pointed out above. Fig. 4 shows the shaver inserted in the holder 101 and it will be noted that the cord 110 is received in a groove 112 which extends along the bottom and both sides of the holder 101. The side of the holder is provided with internal projections 114 and 116 which are positioned to engage the sides of the top parts 118 and 119 of the shaver 103. The parts flank the shaving head 104 and the projections 114 and 116 are designed to protect the head 104 from damage.

The front and back of the holder 101 are somewhat deeply notched as shown in outline at 121 to permit a shaver in the holder to be grasped. The notches also provide access to the cord 110 so that the coiling of the cord in the groove 112 may readily be started.

A projection 123, which may be molded integrally with the body of the holder 101, is located on the back of the holder. It is preferred that this projection be shallow so that the holder 101 may be used as a carrying case. The projection 123 is grooved at 124 and 125 to receive the lips of a holder, for example, the lips of the grooves 88 and 89 of the bracket 81.

A hole 128 of suitable dimension is formed in a wall of the holder 101 to retain a cleaning implement, such as a brush 129. Other accessories for the shaver may be accommodated in a similar manner.

What is claimed is:

1. A combined holder and carrying case for an electric appliance comprising a receptacle having a hollow interior, means associated with said receptacle operative to actuate a control switch on said appliance to the "off" position from its "on" position when said appliance is inserted in said case, and means to actuate said control switch to the "on" position when said device is removed from said case.

2. A receptacle, said receptacle containing an actuating device for a switch operator projecting from and being a part of electrical apparatus to be inserted in and removed from said receptacle, said actuating device comprising a resilient member, means to position said member in the path of movement of said switch operator, said member having apertures, and guide means for said member received in said apertures, said apertures providing for relative movement of said member with respect to said guide means.

3. A combined holder and carrying case for an electric shaver comprising a receptacle having a hollow interior of a shape conforming substantially to the outline of an electric shaver to be received therein, a plurality of shoulders projecting from the body of said case into the interior thereof, said shoulders being spaced to span the cutting head of a shaver, one of said shoulders being positioned to operate a control switch on a shaver to the "stop" position upon engagement of switch operator on the shaver with said last named shoulder, a groove in the perimeter of said receptacle to receive convolutions of the electric cord connected to the shaver, and a projection secured to said receptacle, said projection having means for detachable engagement with a stationary support.

4. A combined holder and carrying case for an electric shaver comprising a receptacle having a hollow interior of a shape conforming substantially to the outline of an electric shaver to be received therein, supporting means on the body of said case in the interior thereof, the spacing of said means being such as to span the cutting head of a shaver to leave the latter free from damaging contact, one of said means being positioned to operate a control switch on a shaver, a groove in the perimeter of said receptacle to receive convolutions of the electric cord connected to the shaver and means integral with said receptacle for detachable engagement with a stationary support.

5. A combined holder and carrying case for an electric shaver comprising a receptacle having a hollow interior of a shape conforming substantially to the outline of an electric shaver to be received therein, a plurality of projections in the interior of said case, said projections being spaced to span the cutting head of a shaver to leave the latter free from damaging contact, one of said projections being positioned to operate a control switch on a shaver, and a projection secured to said receptacle, said projection having flanges for detachable engagement with a stationary support.

6. A combined holder and carrying case for an electric shaver having a switch operator for controlling a switch in said shaver comprising a receptacle having a hollow interior, said hollow interior being so shaped as to enclose substantially all of a shaver to be received therein, said hollow interior being open solely at one end for insertion and removal of a shaver to be received therein, said hollow interior of said receptacle being so arranged as to protect by enclosure the cutting portion of the head of a shaver inserted therein, means associated with said receptacle operative to actuate said switch operator to the "off" position from its "on" position when said shaver is inserted in said case, and a groove in the plane of maximum circumference of said receptacle to receive convolutions of the electric cord connected to a shaver received in the receptacle, said groove being in such a plane that the convolutions of said electric cord enclose the open end of said receptacle.

7. A combined holder and carrying case for an electric appliance comprising a receptacle having a hollow interior, and means associated with and so located with respect to said receptacle as to be operative to actuate a control switch on said appliance to the "off" position from its "on" position when said appliance is inserted in said case.

8. A combination holder and carrying case for an electrical appliance having an electrical cord for connection to a source of power, said case comprising: a front wall and a rear wall of generally the same dimensions, said front and rear walls being connected in spaced apart relation by a peripheral wall, said peripheral wall being formed with a substantially continuous depression throughout its length, the ends of said peripheral wall and a portion of the edges of each of said front and rear walls defining an opening in said case to permit the insertion of an appliance in said case, the depression in said peripheral wall providing a recess for convolutions of the electric cord of said appliance when inserted in said case, the edges of each of said front and rear walls defining the opening in said case having a notch extending toward the center of said walls to facilitate removal of an appliance from said case, a mounting bracket, said rear wall having grooves for detachable engagement with said mounting bracket, said mounting bracket having means for attachment to a rigid support, said bracket being provided with flanges to cooperate with the grooves on the rear wall of said case so that the case may be attached through said bracket to said rigid support, said bracket being so shaped and said grooves being so disposed with respect to said notch in said rear wall as to provide a space between the rear wall of said case and said rigid support and said bracket so that the recesses in said front and rear walls may provide access to an appliance housed in said case when said case is attached to said rigid support through said bracket.

9. A combination holder and carrying case for an electrical appliance having an electrical cord for connection to a source of power, said case comprising: a front wall and a rear wall of generally the same dimensions in length and width, said front and rear walls being connected in spaced apart relation by a peripheral wall having length, width and thickness, the width of said peripheral wall being substantially smaller than the lesser of said dimensions of said front and rear walls, said peripheral wall being formed with a substantially continuous external depression throughout its length, an opening in said case defined by the ends of said peripheral wall and a portion of the edges of each of said front and rear walls to permit the insertion of an appliance in said case, the depression in said peripheral wall providing a recess for the electric cord of said appliance when inserted in said case, the ends of said peripheral wall defining said opening being notched to an extent comparable to the depth of the depression in said periperal wall, said notches in the ends of said peripheral wall effectively continuing the depression in said peripheral wall for the convolutions of the electric cord across the opening in the end of said case, a notch in each of the edges of said front and rear walls defining the opening in said case, and said notches extending toward the center of said walls to provide access to an appliance housed in said case to facilitate its removal therefrom.

10. A combination holder and carrying case for an electrical appliance having an electrical cord for connection to a source of power and also having a vital portion subject to damage upon forceful contact with an object, said case comprising: a front wall and a rear wall of generally the same dimensions in length and width, said front and rear walls being connected in spaced apart relation by a peripheral wall having length, width and thickness, the width of said peripheral wall being substantially smaller than the lesser of said dimensions of said front and rear walls, said peripheral wall being formed with a substantially continuous external depression throughout its length, an opening in said case defined by the ends of said peripheral wall and a portion of the edges of each of said front and rear walls to permit the insertion of an appliance in said case, the depression in said peripheral wall providing a recess for the electric cord of said appliance when inserted in said case, a notch in each of the edges of said front and rear walls defining the opening in said case, said notches extending toward the center of said walls to provide access to an appliance housed in said case to facilitate its removal therefrom, and said front wall, and said rear wall and said peripheral wall being so formed as to provide space between said vital portion of said appliance and the interior of said case when said appliance is housed within said case.

References Cited in the file of this patent

UNITED STATES PATENTS

| | | |
|---|---|---|
| D. 148,931 | Hopkins | Mar. 9, 1948 |
| D. 149,614 | Carr | May 18, 1948 |
| 1,951,656 | Hoffling | Mar. 20, 1934 |
| 1,974,592 | Wolfgram | Sept. 25, 1934 |
| 1,981,853 | Bruce | Nov. 27, 1934 |
| 2,143,529 | White | Jan. 10, 1939 |
| 2,196,786 | Wahl | Apr. 9, 1940 |
| 2,277,143 | Perry | Mar. 24, 1942 |
| 2,378,622 | Derham | June 19, 1949 |
| 2,474,899 | Hutt | July 5, 1949 |
| 2,639,880 | Beloff et al. | May 26, 1953 |
| 2,667,966 | Jepson et al. | Feb. 2, 1954 |

OTHER REFERENCES

Gillette Advertisement, Washington Star, Nov. 27, 1938. (Copy in Div. 40.)